Oct. 14, 1969
M. W. SIMS
3,471,926
PROCESS FOR TURN DEVELOPMENT OF ELECTRICAL
COILS IN INDUCTIVE DEVICES
Filed Sept. 30, 1968
4 Sheets-Sheet 1
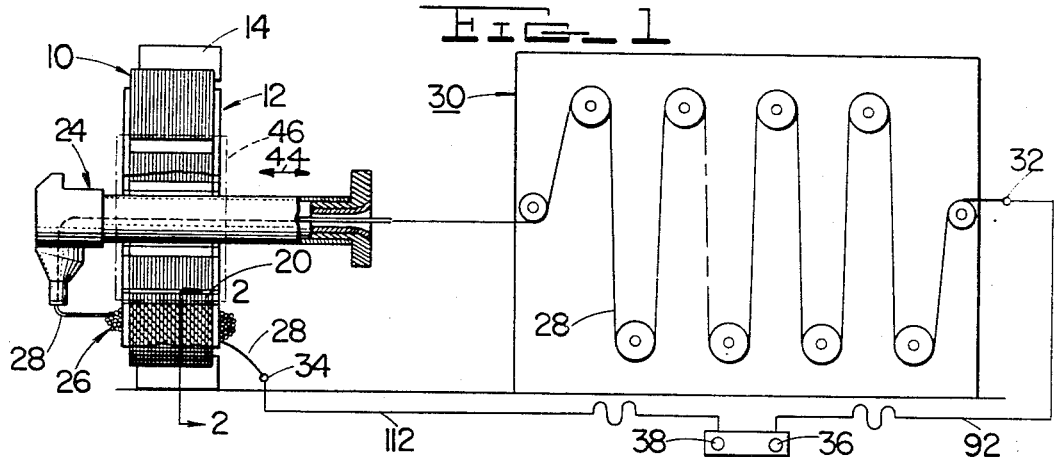
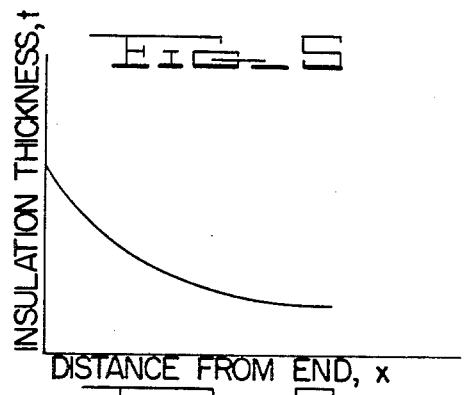
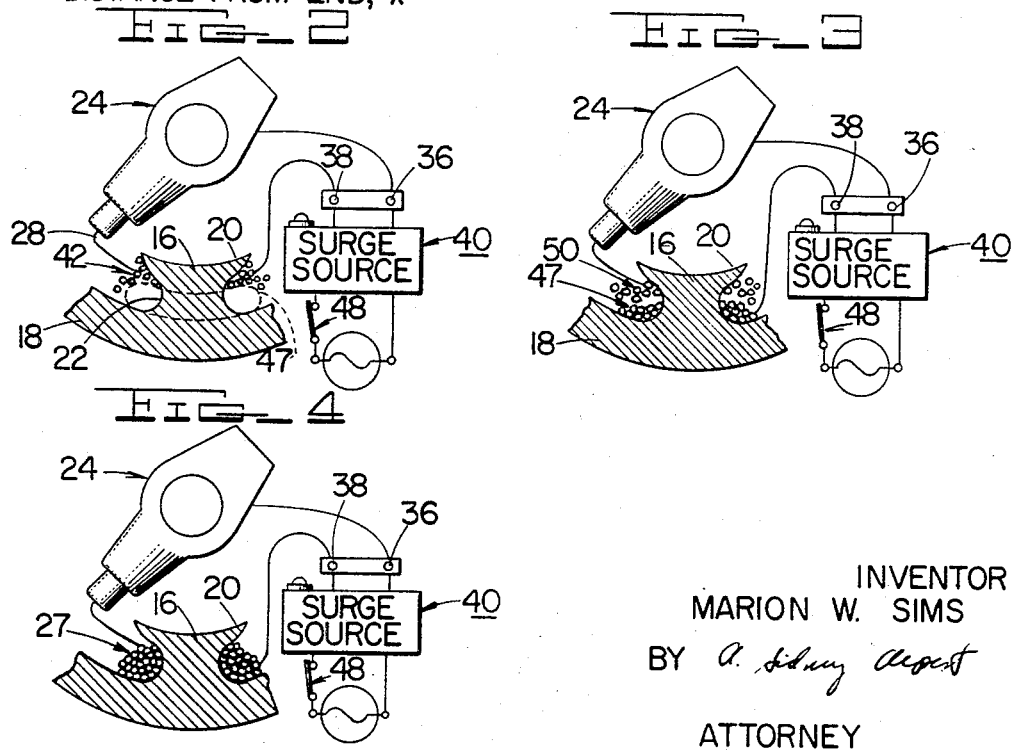
INVENTOR
MARION W. SIMS
BY *A. Sidney August*
ATTORNEY

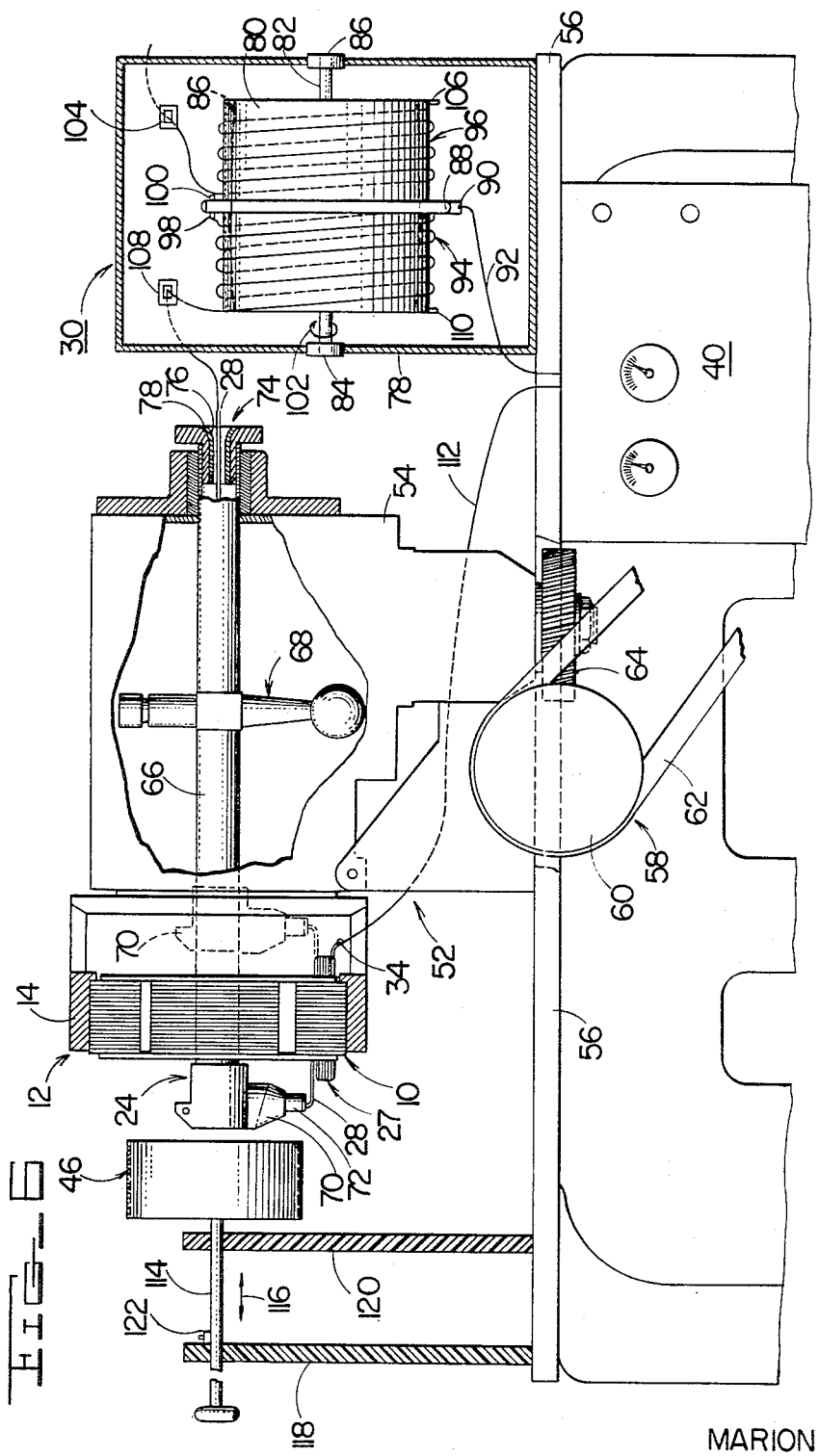

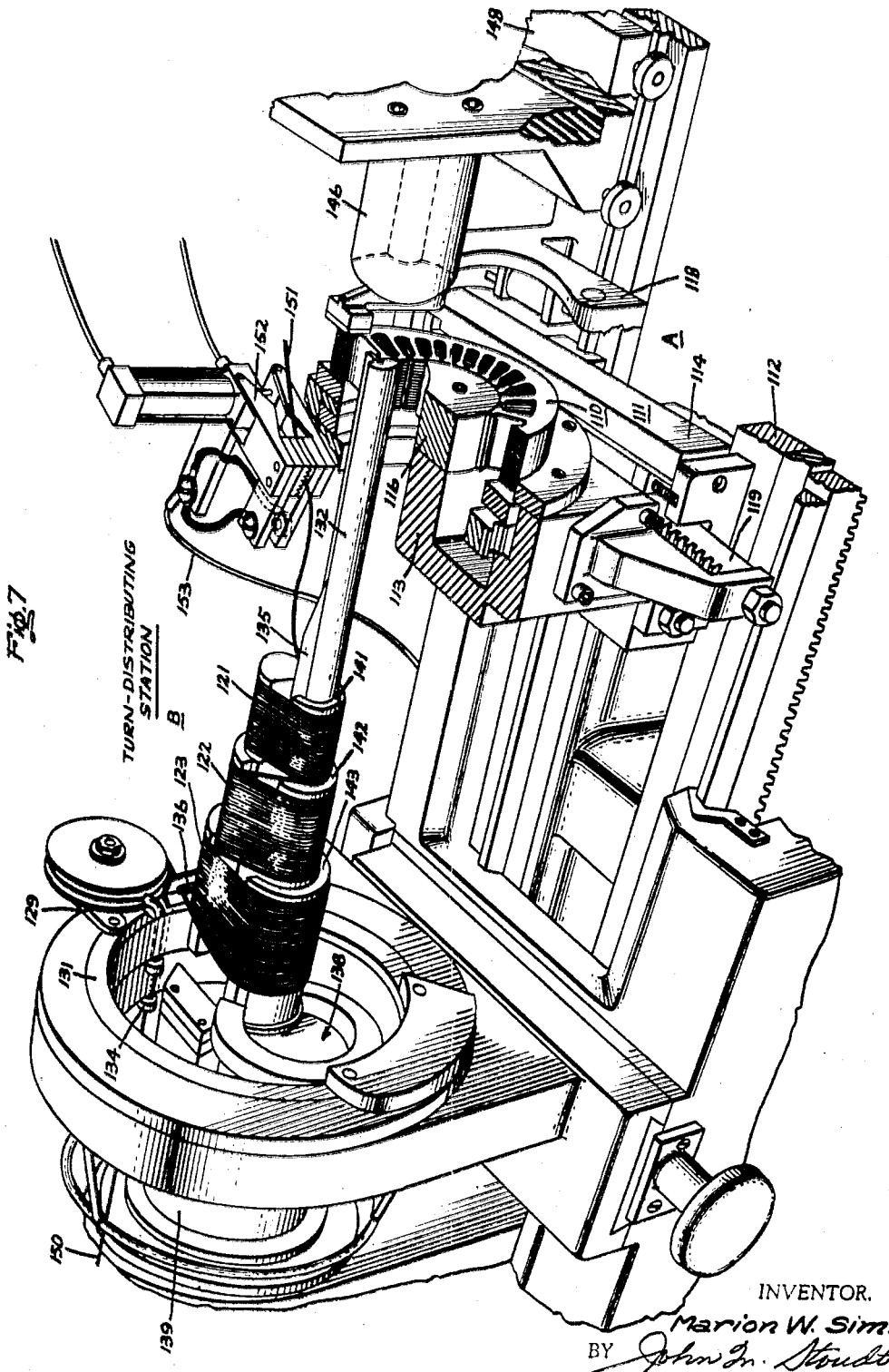

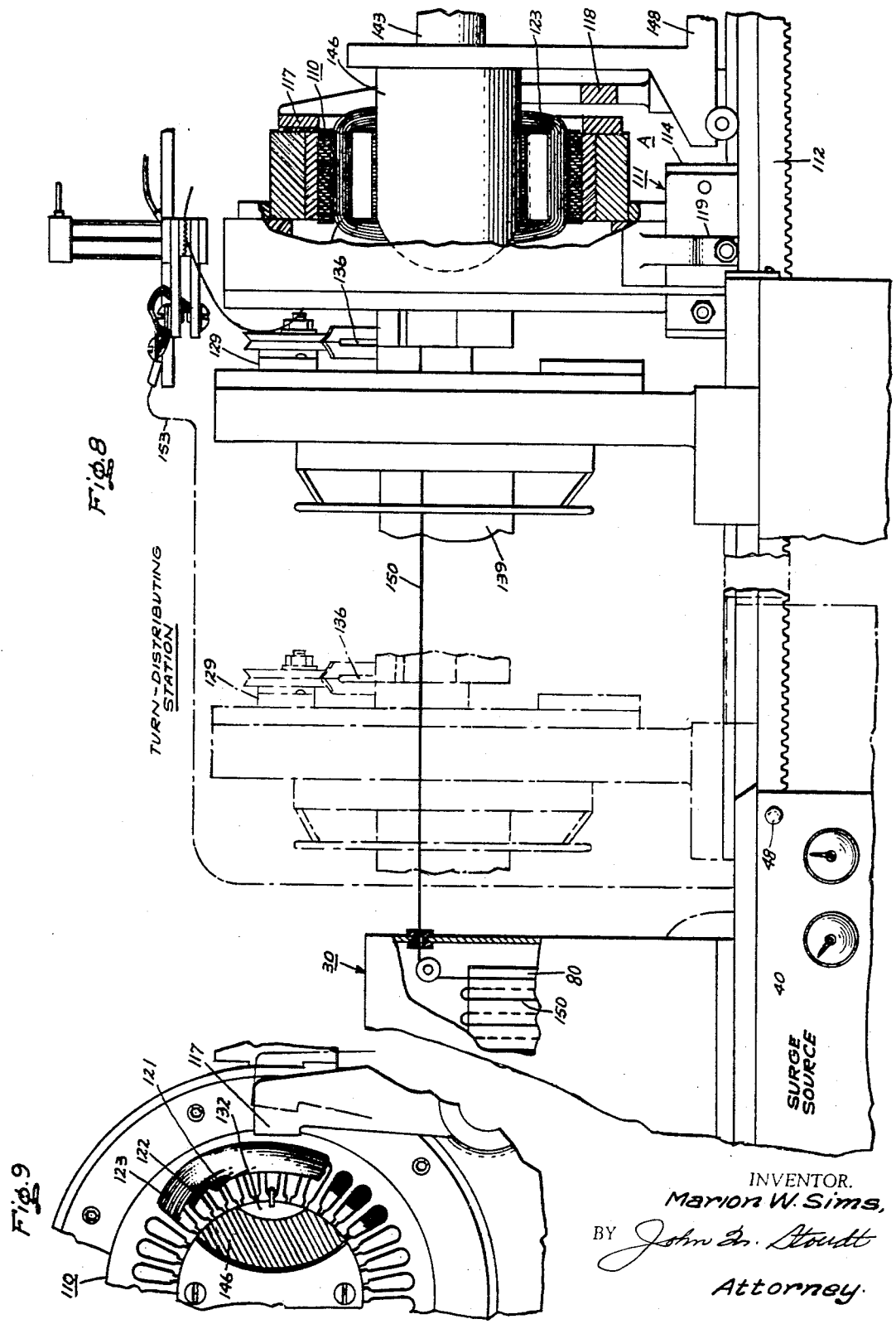

United States Patent Office 3,471,926
Patented Oct. 14, 1969

3,471,926
PROCESS FOR TURN DEVELOPMENT OF ELECTRICAL COILS IN INDUCTIVE DEVICES
Marion W. Sims, Fort Wayne, Ind., assignor to General Electric Company, a corporation of New York
Filed Sept. 30, 1968, Ser. No. 767,914
Int. Cl. H02k 15/08; H01f 7/06
U.S. Cl. 29—605    18 Claims

ABSTRACT OF THE DISCLOSURE

Process developing a number of electrical turns in magnetic core slots from a length of wire, with the core being supported in a core holder at a particular location, for instance a turn-distributing station, as the number of electrical turns are being distributed in the slots. During the distribution of the number of turns, a part of the length of wire is disposed in a wire accumulator, with the length of wire electrically connected across an electrical energy surge source. As the core having the number of turns is still supported in the core holder at the particular location, electrical energy surges are generated in the turns to create electromagnetic forces in the vicinity of the turns thereby effecting in-situ development of the turn into coils.

The coils are thus efficiently economically developed in a core at a single location without need for the core being removed from the location until the coil development has been completed. In addition, improved control of coil development is achieved to provide a high degree of turn compaction in the slots, especially effective in regard to development of concentrated type windings for stator cores.

Cross-reference to related application

This is a continuation-in-part application of my co-pending application Ser. No. 568,591 filed July 28, 1966, which in turn in part discloses subject matter disclosed in my still earlier filed application Ser. No. 414,824 filed Nov. 30, 1964 (now U.S. Patent 3,333,335 issued Aug. 1, 1967).

Background of the invention

This invention relates to processes for development of electrical coils in induction devices, and more particulralry to improved processes for developing coil turns into wound coils useful in motor stators, rotors, and the like, especially suitable for distributing coil turns into slots of inductive devices.

In the manufacture of electrical induction devices, such as for example, stator or rotor cores useful in electric motors, a number of wound electrical coils formed of a plurality of turns are, in one approach, developed in the coil-accommodating slots of the core by first distributing turns in the slots by a suitable coil winding machine and thereafter compacting or moving the turns into final wound coil position. One such coil winding machine is disclosed, for example, in the United States patent to Lowell M. Mason, No. 2,934,280, assigned to the same assignee as this application.

In the past, various mechanical devices have been used to accomplish the necessary compaction of the turns in the coil-accommodating slots to complete the wound electrical coil development. However, in United States patent applications Ser. Nos. 414,822, 414,823, 414,824, 414,825, and 414,825 which issued into Patents 3,333,327–3,333,-330 inclusive and 3,333,335 on Aug. 1, 1967 and which are all assigned to the same assignee as this application, novel and unique ways for the transformation or alteration, including compaction, of coils in electromagnetic devices are disclosed and claimed. These innovations all involve the use of electrical energy in one form or another for achieving the desired results and thus obviate the need for the older mechanical devices.

It is highly desirable to make use of the electriacl energy approach in conjunction with turn-bistributing equipment, especially those which distribute turns directly into the coil-accommodating slots to enable production of electrical induction devices in a more expeditious and efficient manner. In particular, it is desirable to utilize electrical energy in the development of electrical coils as the turns are being placed in the slots at a turn distributing station without necessitating the removal of the core from the station. Further, it is advantageous in the manufacture of electrical inductive devices to be able to compact the turns during various desired stages of the turn developing process and thus achieve better control of the turn placement in the slots and more efficient development of the wound electrical coils.

Summary of the invention

Accordingly, it is an object of this invention to provide a novel and improved process for developing wound electrical coils in induction devices which achieves at least some of the desired results mentioned above.

It is a more specific object of the instant invention to provide a novel and improved process for developing wound electrical coils in magnetic cores which eliminates the necessity for a coil compacting procedure independent of the machine which places the coil turns in the core, allowing the coil turns to be compacted at desired stages luring the placement where desired.

In carrying out one form of my inventon, I provide an improved process for developing wound coils carried by an electric induction device, such as a motor stator. In one illustrated exemplification, a slotted structure in the form of a stator core is supported in a core holder at a turn-distributing station and a portion of a predetermined length of electrically conductive insulated wire is stored in an accumulator. A number of electrical turns are placed in selected coil-accommodating slots of the core by a turn-distributing assembly, for example by a winding gun assembly or turn-inserting assembly. One end of the conductive wire extends from the accumulator through the assembly for distributing the wire into coil-accommodating slots of the supported stator core. The conductive wire, including the portion in the accumulator, is electrically linked with an electrical energy surge source capable of producing an electrical energy surge or pulse of predetermined magnitude.

In the exemplification a preselected length of the electrically conductive insulated wire is distributed in a number of conductor turns directly into the coil-accommodating slots of the stator. The turn-distributing operation is then interrupted and a rigid nonmagnetic electrically conductive structure, for instance an insulated copper or aluminum cylinder capable of conducting eddy currents, is introduced into the stator bore at the turn-distributing station as the turn-distributing assembly is withdrawn from the bore. The surge of electrical energy is then injected into the conductive wire from the energy source creating electromagnetic forces in the vicinity of the number of turns which are then compacted thereby into at least part of a wound coil. This procedure may be repeated, if desired, until the wound coils of the stator are fully developed.

My method of coil development is not only efficient and economical, but also allows the wound coils to be developed without adversely effecting the wire insulation since there is no need for application of external mechanical forces against the insulated wires. Further, the coils are developed as the coil turns are distributed without requiring that the stator be removed from the turn-distributing station of the equipment, thus being efficient and economical. In addition, by my method it is possible to achieve better control over the coil placement, as the coil turns are compacted during intermediate stages of distribution, if desired, thereby providing room for additional turns to be wound in the coil-accommodating slots, which additional turns are then compacted as necessary to develop the completed wound coil. This is especially advantageous in the development of stators having concentrated windings wherein a relatively large number of coil turns are used in each wound coil. In this regard, while it is quite difficult to accomplish compacting of concentrated windings either mechanically or by use of electrical energy surges after all the turns are wound, this compacting is much more efficient when done at intermediate stages.

The subject matter which I regard as my invention is particularly pointed out and distinctly claimed in the concluding portion of the specification. The invention itself, however, together with further objects and advantages thereof, may be best understood by reference to the following description taken in conjunction with the accompanying drawings.

Brief description of the drawings

FIGURE 1 is a schematic elevational view, partially broken away and partially in section illustrating one form of my invention in connection with the coil development of a stator core and with apparatus capable of carrying out one form of the inventive process;

FIGURE 2 is an enlarged partial sectional view taken substantially on the plane of the line 2—2 of FIGURE 1, and also partially in front elevation and partially in schematic form illustrating a first stage of turn placement or distribution at a turn-distributing station by the apparatus of FIGURE 1 in the stator coil-accommodating slots, with several of the coil turns being shown by the broken lines toward the bottom of the slots as achieved in accordance with one form of the present invention;

FIGURE 3 is a view similar to that of FIGURE 2 illustrating the several turns of FIGURE 2 in their final or compacted condition, the apparatus of FIGURE 1 having since distributed several additional coil turns;

FIGURE 4 is a view similar to that of FIGURES 2 and 3 further illustrating the way in which the coil turns are developed in this exemplification at the turn-distributing station;

FIGURE 5 is a graphic presentation revealing variation in thickness of insulation on a coil accumulator drum of the illustrtaed exemplification for a given drum location;

FIGURE 6 is a side elevational view, partially broken away and partially in section, of the coil developing apparatus of FIGURE 1 including the coil accumulator, the electrical energy surge or pulse source and a nonmagnetic electrically conductive structure;

FIGURE 7 is a partial view in perspective, partly broken away to show details of the coil developing process being carried out by apparatus having a turn-distributing assembly which is capable of inserting turns producing at least part of a polar group of coils in slotted structures, such as the illustrated stator core, with the stator core being disposed at the turn-distributing station preparatory to the placement of turns in the slots of the core;

FIGURE 8 is a side elevational view, partly in schematic form, of a portion of the coil developing apparatus shown in FIGURE 7, the view showing turns in at least part of a first polar group of coils being developed at the turn-distributing station to show additional aspects of the process; and FIGURE 9 is a partial cross-sectional view of the core, turns, and adjacent coil developing apparatus seen in FIGURE 8.

Description of the preferred embodiments

Having more specific reference now to FIGURES 1–4, I have illustrated therein various aspects of one form of my invention as applied to the coil development in a slotted structure in the form of a six-pole stator core 10 of a dynamoelectric machine. In FIGURE 1, I have shown schematically the stator core 10 supported in the turn-distributing station 12 by suitable supporting means 14 disposed in an upright position to enable the coils to be developed therein. The stator core, as further illustrated in FIGURES 2–4, includes six poles 16 extending inwardly from the stator yoke section 18 and defining a bore 20. Each pole 16 further defines coil-accommodating slots 22 thereabout for receiving the wound electrical coils.

As shown in FIGURE 1, one form of the process is illustrated in connection with apparatus capable of carrying out the process. A suitable turn-distributing member or assembly, for instance a winding gun generally denoted by reference numeral 24, the illustrated one being similar to that revealed in more detail in the aforementioned Mason patent, is utilized to distribute a plurality of turns 26 of electrically conductive insulated wire 28 in the coil-accommodating slots 22 of the stator core 10. A predetermined length of the wire 28 is disposed in an accumulating or storage means 30 and threaded into the wire gun 24. It will be understood that a sufficient length of the wire 28 may be stored, if desired, in the accumulator means 30 for developing a complete set of wound coils in the six-pole stator core 10 and including additional lengths for making connections through the winding gun. The ends of the wire 28 are respectively connected by suitable electrical connections 32 and 34 to the output terminals 36 and 38 of an electrical energy surge source 40 to provide a closed electrical path.

Referring to FIGURES 2–4, it will be seen that in the illustrated exemplification a wound coil 27 is developed in the stator core 10 at the turn-distributting station in accordance with one form of my process. A first portion of the wire 28 is wound as a number of loosely placed coil turns 42 in first coil-accommodating slots 22 of the stator core 10. At this time, after a desired length of the wire, or a desired number of turns have been wound, the winding gun 24 is moved out of the stator bore 20. The gun 24 normally travels axially through the bore 10 in the direction shown by indicating arrow 44 in order to distribute the turns therein.

The turns distributed in slots 22 are then compacted or otherwise transformed by generating an electrical surge or pulse of the desired magnitude in the distributed turns as the core is retained in the turn-distributing station. This is accomplished in the illustrated embodiment by first removing the gun from bore 20 and moving a rigid nonmagnetic electrically conductive structure capable of conducting eddy currents, shown in FIGURE 1 in phantom and denoted by reference numeral 46, in an axial direction toward winding gun 24 into the bore 20. The switch 48 of the surge source 40 is then closed and an energy surge of preselected magnitude is injected into the entire length of the electrically inductive insulative wire 28, including the portion formed as coil turns 42 and the portion remaining in the accumulator 30. Eddy currents are induced in the structure 46. As a result of the interaction of the magnetic fields produced by the high electrical energy surge generated in the turns 42 and the eddy currents in the structure, electromagnetic forces are caused to act on the turns 42 to push back and compact the turns toward the bottom of the slots 22 as seen in FIGURES 2 and 3 thereby effecting the desired transformation or alteration. Thus, the loosely wound turns 42 are moved to the position denoted by reference numeral 47 as a first step in the development of the wound coil 27.

After the first group of coil turns have been compacted, the structure 46 is withdrawn from the stator bore 20 and the distribution or placement of additional loosely placed coil turns 50 (FIGURE 3) is effected by the winding gun 24. After a desired number of additional turns 50 are wound in the slots 22, the gun 24 is again withdrawn, and the structure 46 moved into position and at least one more energy pulse is injected into the wire 28. This pulse will cause the additional loosely formed coil turns 50 to be compacted, as shown in FIGURE 4, as well as causing the previously formed and compacted coil turns 42 to be further compacted.

The steps of disposing or distributing additional loose turns and compacting the additional turns by injecting pulses in the wire 28 are repeated at desired intervals until the wound coil 27 is fully developed. Further, the stator core 10 may be indexed or rotated by any suitable indexing means, such as that disclosed in the aforementioned Mason patent, and the six wound coils carried by the core 10 are fully developed by repeating the steps outlined above. It will be understood that the surge source 40 may be energized any number of times during the wound coil development procedure depending upon the degree of compaction of the coils desired and the number of times it is desired to interrupt the coil developing equipment. The stator, of course, will remain or be maintained at the turn-distributing station 12 in the holding means 14 at all times until the wound coils are fully developed therein in-situ, that is, at that station or general location, at which time the completed stator core will be removed, a new stator core inserted, and another length of wire disposed in the accumulator means 30 to be developed in the new stator core.

The energy surge source 40 used in the exemplification of my invention may be any suitable type, for example, the one illustrated and described in greater detail in my aforementioned Patent No. 3,333,335. The surge source may include a bank of capacitors which are charged to a selected voltage level and after a predetermined interval discharged at the output terminals 36 and 38. It will be understood, of course, that one or more high energy surges may be injected into the wire at each stage of coil development to effect the compaction of coil turns 42.

Referring to FIGURE 6, the coil developing apparatus generally denoted by reference numeral 52 includes a winding portion 54 mounted on a bed 56. The winding portion 54 includes a suitable driving means 58 including, but not limited to, a pulley 60, belt 62, and gear 64. Additional details of a suitable winding portion 54 and driving means 58 are more fully disclosed in the Mason patent.

The previously described winding gun 24 includes an elongate body portion 66 which has mounted thereon a cam follower means 68 for effecting the axial movement of the gun. Further, the winding gun 24 includes a winding head 70 having an outlet or nozzle 72 from which the wire 28 is wound into the coil-accommodating slots 22 of the stator core 10. It will be seen in FIGURE 6 that the above described axial movement of the winding gun 24 is illustrated by winding head 70 as it is shown in a first position by lines in full and in a withdrawn position by dashed lines.

The winding gun 24 includes an opening 74 at the rear end of the body 66 into which the wire 28 is threaded. I have found it desirable to add a layer of suitable insulating material 76 to the central bore 78 of the winding gun in order to electrically insulate the wire from the gun body and head due to the relatively high energy levels injected into the wire 28.

The accumulator means 30 described briefly above and illustrated schematically in FIGURE 1 in the exemplification comprises a generally rectangular housing 78 which is mounted on the machine bed 56 adjacent the rear end of the machine 52 in order to be accessible to the opening 74 in the rear end of the winding gun 24. A cylindrical drum 80 is rotatably mounted in the housing 78 on the shaft 82, which shaft is supported in bearings 84 and 86 mounted in opposed walls of the housing 78. The drum 80 is provided with a nonuniform layer of insulation 86 on the outer periphery thereof for a purpose to be discussed more fully hereinafter.

In order to electrically connect one output terminal of the energy surge source 40 to a first end of the electrical wire 28, I have provided a slip ring and brush arrangement. Thus, a slip ring 88 is mounted on the cylindrical drum 80 for rotation therewith, and an electrical brush 90 is suitably mounted in the housing 78 for constant electrical contact with the slip ring 88 as the; slip ring and drum revolve. It will be seen that an electrical lead 92 connects the brush 90 to the surge source 40. The slip ring 88 divides the drum 80 into two portions 94 and 96 to enable portions of two predetermined lengths of wire 28 to be supported on the drum at the same time. Further, the slip ring 88 includes two terminals 98 and 100 thereon in order to provide means for connecting one end of each of the predetermined lengths of wire to the slip ring 88 and hence through the brush 90 and lead wire 92 to the energy surge source 40.

It will be seen in FIGURE 6 that a first length of wire may be wound onto the drum portion 96 as the drum revolves in the direction of indicating arrow 102 through an opening 104 in the wall of the housing 78. The end of this portion of wire is connected to a connecting lug 106 on the drum 80 and hence when the drum revolves, the wire will be withdrawn through the opening 104 from a spool of wire or the like and wrapped onto the drum. Further, while the length of wire is wrapped onto drum portion 96, a length of wire previously wrapped on the drum portion 94 is withdrawn through a second opening 108 in a wall of the housing 78 and fed through the wire gun 24 for distributing the wound coils 27 in the stator 10. The end of the wire disposed on the drum portion 94 which was previously connected to the mounting lug 110 in order to be wound thereon is removed from the lug 110 and fed into the wire gun 24 while the other free end of the wire is connected to the terminal 98 for electrical connection to the surge source 40. It will be appreciated also that the first end of the wire from drum portion 94 is connected to the surge source 40 by a suitable connecting lead 112 in order to complete an electrical circuit across the output terminals 36 and 38.

Although I have illustrated the cylindrical drum 80 disposed in the housing 78 as divided into two portions by the slip ring 88 for accumulating the two lengths of wire thereon, it will be readily appreciated that the drum may have only a single portion for receiving a single length of wire or three or more portions for receiving three or more lengths in order to develop wound coils in a stator. The particular arrangement of FIGURE 6, however, enables one length of wire to be wound upon the drum while another length is being used to develop the stator coils, and thus expedites the coil development procedure by eliminating the need to halt the turn-distributing operation in order to disposed an additional length of wire in the accumulator. Thus, when the wire wound upon drum portion 94 is used to fully develop the coils of one stator, it is a simple matter to remove the end of the wire fastened on the lug 106, feeding this end into the wire gun 24 through the opening 104 while attaching the other end to the slip ring terminal 100. The rotation of the drum will, of course, again be in the direction indicated by arrow 102. The then empty drum portion 94 will then be ready to have wound thereon another predetermined length of wire without changing the direction of drum rotation.

Turning now to FIGURE 5 in conjunction with FIGURE 6, I have shown a graph illustrating a desirable variation in thickness of the insulation 86 disposed on the outer periphery of the drum 80 in order to maintain the inductance across the output terminals of the energy surge source 40 substantially at a constant value. It will be observed that with a drum type accumulator as illustrated in FIGURE 6, the energy surge passes through the whole length of wire 28 connected to the output terminals of the surge source 40, including the turns of wire remaining on the drum. The turns of wire on the drum thereby comprise a series inductance with the coil turns which have been wound in the stator. It is, of course, desirable to keep the total inductance value across the surge source substantially constant, to alleviate the need for compensating for any changing inductance in the load by the source circuit itself.

In order to limit the transient inductance in the circuit across the output terminals 36 and 38 of source 40, the accumulator drum 80 is constructed of an electrically conducting, nonmagnetic material such as copper or aluminum. This drum construction will permit the induction of eddy currents which have the effect on restricting the magnetic path taken by flux linking the turns on the drum to the region between the surface of the drum and the turns. This restricted path, being of relatively high reluctance, limits the total transient inductance in the turns.

In order to render the total series inductance of the turns wound into the stator and the remaining accumulated turns substantially constant, the drum insulation 86 is varied from each end of the drum or adjacent the lugs 106 and 110, in general accord with the curve illustrated in the graph of FIGURE 5. Thus, the insulation is thickest at each lug end and thinnest adjacent the slip ring. It is believed that by virtue of this nonuniform or varying insulation thickness on the drum surface, the total impedance of the discharge circuit of energy surge source 40, and of the total length of wire 28 connected across the output terminals of the surge source, will remain substantially constant.

Referring again specifically to FIGURE 6, it will be observed that the rigid nonmagnetic electrically conductive structure previously referred to by reference numeral 46 in the illustrated form comprises a cylindrical member supported on a shaft 114 for reciprocal movement as indicated by the indicating arrow 116. The cylinder 46 is constructed of copper or aluminum and may be either a solid or a hollow cylinder of such material, so long as it will conduct eddy currents. Additionally, the cylinder will normally be covered by suitable electrical insulation. The shaft 114 is supported by two upright standards 118 and 120 which are in turn mounted on the machine bed 56 adjacent the forward end of the winding machine 52, or adjacent the winding station 12. Further, suitable locking means generally denoted by reference numeral 122 is provided on the upright 118 in order to lock the cylinder 46 in either the withdrawn position illustrated in FIGURE 6 or the forward position illustrated in FIGURE 1. It will be understood that the purpose of the cylinder 46, which is capable of conducting eddy currents, is to produce a magnetic field concentrating the field about the wire turns in the stator when the surge source 42 is energized to inject an energy pulse into the wire 28.

It should also be understood that even without the cylinder 46 in the stator bore, there will be an appreciable compacting effect of the coil turns, although a higher surge energy may be required for a given compacting effect. However, the compaction results achieved while using the cylinder will, of course, be better.

Also, in the exemplification the desired surge of electrical energy may be generated in the turns distributed in the slots as the core having the turns is supported in the turn-distributing station by employing a primary winding supported next to the distributed turns in the manner disclosed in my aforementioned Patent 3,333,- 335. An unusually high force level may be attained by connecting or otherwise electrically linking both the primary winding and the distributed turns (including the wire on the accumulator, if such is used) across source 40. More specifically in the alternative, either the primary winding or turns may be short-circuited to produce a closed electrical path which is then electrically linked to the other which in turn is connected to the source. For example, the structure 46 may be readily modified to carry the primary winding (not shown) therein forming a magnetic pole which simulates the pole formed by the wound coil 27 in the manner more fully disclosed in my aforementioned Patent 3,333,335. In developing the wound coil 27 in this instance, the primary winding will be electrically linked with the surge source terminals 36 and 38 by connecting it across the terminals, and the slip ring 88 used to shirt circuit the wound turns 26. A surge of energy is injected into the primary winding, inducing or otherwise generating current flow in the shorted turns 26, thereby compacting or otherwise altering the configuration of the turns 26. Thus, in effect, turns 26 are connected across the surge source.

Referring now to FIGURES 7–9 inclusive, a modified form of my coil developing process is illustrated in connection with other apparatus where similar components to those already described in regard to the first six figures will be identified by the same numerals. In the latter embodiment the slotted structure is in the form of a thirty-six slotted stator core 110 for use in a four pole single phase dynamoelectric machine. As in the first exemplification, it is held in a turn-distributing station in position A by any suitable supporting means 111 disposed in an upright position to enable the coils to be developed therein. As illustrated, means 111 is mounted to frame 112 and is similar to that disclosed more fully in the copending U.S. patent application Ser. No. 657,666 of James B. Duff and Lowell M. Mason filed Aug. 1, 1967 and assigned to the same assignee as the present invention. It comprises an upright mechanism or assembly 113 mounted for transverse or radial sliding movement in base 114. The assembly mounts a detachable mandrel 116 constructed with a partially outer surface adapted to fit the bore of the core for support thereof. A pair of spaced apart arm members 117 (one being shown) are pivotally attached to support 118, operative between open and closed positions in the manner revealed in the above mentioned James B. Duff et al. application. An indexing device 119 is also incorporated to impart the proper indexing angle to core 110 when such is desired.

The desired number of turn pluralities to be distributed in core 110 are initially wound or otherwise formed at position B adjacent A at the turn distributing station from insulated electrically conductive wire, the turn pluralities 121, 122, 123 being at least portions of coils having differing spans of a distributed winding. This may be accomplished in any suitable manner, such as a collapsible, stepped cantilever mounted coil form 114 and flyer 116 rotatably carried by an axially movable carriage 117 mounted for movement on a frame 118, the parts having the same general construction more fully set out in the L. M. Mason Patent 2,934,099 issued Apr. 26, 1960. The flyer includes a wire receiving pulley rotatably mounted to a flange 129 of ring gear 131. Coil turn pluralities 121–123 inclusive are formed by moving the carriage 127 toward the left as viewed in FIGURE 7 to the position shown in full, that is, in an axial direction away from the free end of winding form 124 as the flyer rotates around the form to wind the wire or conductor turns tightly over the form in the manner discussed in the Mason Patent 2,934,099. A counter (not shown) may be included to regulate the number of turns in each coil turn pluralities. Since these details are more fully outlined in the Mason patent, no further description will be set forth here of the coil forming operation, except to note that the illustrated form includes an elongated stationary member 132 extending axially toward position A, with its free end having a key 133 adapted to fit into a particular slot entrance of core 110 for insuring proper axial alignment between positions A and B. A metal support 135 may be secured next to member 132 for augmenting rigidity of the member. As will be brought out more fully hereinafter, the wire may be fed to the form from accumulator 30 (FIGURE 8) located at the rear of the frame, axially through a tubular passage 136 and pulley groove of the flyer, into a slotted wire guide 137 attached to rotate with ring gear 131.

Once the turn forming operation has been completed and the flyer is in the retracted position shown in full, the coil form is collapsed to release the turns in the way described more fully in the Mason patent. The coil turn pluralities are then transferred from position B toward position A, where the stator core is supported for distribution into selected slots of the core. Any suitable arrangement may be employed for this operation, such as turn-distributing assembly 138 having elongated tools suitably mounted within a tubular sleeve attached to housing 139 of the type shown by the Mason patent. The elongated tools may include transversely curved divider members 141–143, which serve as part of the winding form, and separate pusher elements (not shown in detail) corresponding in number to that of the coil turn pluralities to be inserted, e.g., three in number in the exemplification constructed in the way more fully described in the aforementioned co-pending application Ser. No. 657,666.

Once the coil turn pluralities have been distributed or placed in the selected slots (FIGURES 8 and 9) and the turn-distributing assembly 138 retracted to that shown in FIGURE 7, an electrical energy surge is generated in the turn pluralities 121–123 to effect their compaction or other desired alteration thereof. Like the illustrated first embodiment, a rigid nonmagnetic electrically conductive structure 146, capable of conducting eddy currents, is disposed on the side of the core remote from turn-distributing assembly 138 and is moved in an axial direction toward assembly 138 into the bore of the core. To effect this movement structure 146 is attached to an upright wall 147 of wheeled carrier 148.

It should be noted at this time that, like the first illustrated exemplification, accumulator 30 is capable of storing a sufficient length of wire 150 for developing a complete winding for core 114 having four polar groups of coils comprising three concentric coils in each group as well as additional lengths for making the necessary connections. The ends of wire 150 are respectively connected by suitable electrical connections to the output terminals of electrical energy surge source 40. In particular, end 151 is held by a pair of operative jaws 152 of a wire retaining mechanism which makes electrical contact with the wire in the manner disclosed in the Smotherman Patent 3,391,379. The jaws are in turn electrically connected by conductor 153 to one side of source 40. The other end is attached in the way already outlined for the first exemplification.

Operating switch 48 of surge source 40 is closed to provide a closed electrical path and an energy surge of preselected magnitude is injected into the entire length of wire 150, including the turn pluralities 121–123 and the portion remaining in the accumulator 30 to effect the desired transformation or alteration of the turn pluralities into the compacted and press-back position shown in FIGURE 9 as the core 110 is being held in the turn-distributing station. It will be appreciated that the electrical energy surge generation produced in the turn pluralities to effect the desired alteration may be suitably accomplished as already discussed in connection with the first exemplification and no additional comments will be set out here.

Additional turn pluralities may be formed on the winding forms by flyer 126 and if desired placed in the same slots as turn pluralities 121-123 by turn-distributing assembly 138, the additional turn pluralities being altered in the manner already outlined for pluralities 121–123. In the alternative, the core 110 may be indexed to the next angular position as outlined in the above mentioned Duff et al. application, and the additional turn pluralities placed in slots to form other poles of the winding. These cycles may be repeated as frequently as necessary until all four polar groups of coils have been properly developed. The reproduction of the energy surges in the turn pluralities has the added benefit of subjecting the pluralities to compacting forces a number of times. At the conclusion of these cycles, the jaws of the wire retaining mechanism may be actuated to release the end of the wire and ultimately clamp the end of another wire for use in the next core. The core having the developed coils may then be removed from the turn-distribution station for subsequent manufacturing operations to be performed thereon.

Thus, like the first embodiment the coils are efficiently and economically developed in the slotted structure at a single location without need for removal of the structure from the equipment until after the completion of such development. Further, improved development of the coils is attained to produce a high degree of compaction.

From the foregoing description it will be apparent that coil developing processes for inductive devices such as stator cores, armatures and other coil-accommodating members which incorporate a form of my invention may be economically and efficiently accomplished without utilizing mechanical means physically contacting the windings, and without the need for removing the inductive devices from the turn-distributing location employed for placing turns into the members. Further, such coil developing procedure is especially effective for use in connection with turn producing members even of the type which winds or distributes individual turns directly into the coil-accommodating slots of the member. It will also be appreciated that although in the illustrated exemplifications, the principles of my invention were applied in the manufacture of stator cores of dynamoelectric machines, the invention can be advantageously employed to carry out coil developing operations in other electromagnetic devices. It should further be understood that various modifications could be made to the exemplification without departing from my invention.

Consequently, while in accordance with the Patent Statutes, I have described my invention by reference to particular embodiments thereof, it is to be understood that many other modifications may be made by those skilled in the art without actually departing from my invention. It is, therefore, intended in the following claims to cover all such equivalent variations as fall within the true spirit and scope of this invention.

What I claim as new and desire to secure by Letters Patent of the United States is:

1. A method of in-situ development of electrical coils in coil-accommodating slots of a magnetic core having a bore and constructed to receive at least one wound coil, the coil being developed directly in the core slots at a turn-developing station, the method comprising the steps of: disposing a predetermined length of an electrically conductive insulated wire in an accumulating means; electrically connecting the ends of the electrically conductive insulative wire across an electrical energy surge source; distributing a portion of the predetermined length of electrically conductive insulated wire into the coil-accommodating slots of the magnetic core to form a preselected number of turns and generating at least one energy pulse in the insulated wire from the electrical energy surge source while the core is in the turn-developing station thereby causing current to flow through the electrically conductive insulated wire and compacting the preselected turns; distributing at least one more portion of the predetermined length of the insulated wire into the coil-accommodating slots to form additional turns and generating at least one more energy pulse into the insulated wire from the energy source and compacting the additional turns and further compacting the preselected turns.

2. The method of claim 1 including repeating the distributing and generating steps until the predetermined length of electrically conductive insulated wire is used to form the desired wound coils in the magnetic core.

3. The method of claim 1 wherein the step of disposing a predetermined length of an electrically conductive insulated wire in an accumulating means includes disposing electrically conductive insulated wire of sufficient length to develop the total number of wound coils to be wound in the core from one predetermined length of wire.

4. The method of claim 1 wherein the step of generating at least one energy pulse into the insulated wire includes injecting an energy pulse of a magnitude below that which is injurious to the wire insulation.

5. The method of claim 1 wherein the step of disposing a predetermined length of an electrically conductive insulated wire in an accumulating means includes the step of winding on an accumulator drum at least enough electrically conductive insulated wire to develop the total number of coils to be wound in the core from one predetermined length of wire, and the step of connecting the ends of the electrically conductive insulated wire across an electrical energy surge source includes electrically connecting one of the ends of the electrically conductive insulated wire to an electrically conductive means on the accumulator drum, and electrically connecting said electrically conductive means to said electrical energy surge source.

6. The method of claim 1 including the further step of moving a rigid nonmagnetic electrically conductive material capable of conducting eddy currents into the bore of the core.

7. A method of developing wound electrical coils in coil-accommodating slots of a magnetic core having a bore and constructed to receive at least two wound coils, the wound coils being developed in the core slots at a turn-distributing station, the method comprising the steps of: disposing the magnetic core at a turn-distributing station; distributing a predetermined length of electrically conductive wire in the core slots to form a number of conductor turns; injecting at least one surge of electrical energy into the conductor turns to develop the turns into part of the wound coils while the core is disposed at the winding station; distributing additional turns in the core slots and injecting additional surges of electrical energy therein until the wound coils of the core disposed at the turn-distributing station are fully developed.

8. The method of claim 7 including the further step of moving a rigid nonmagnetic structure capable of conducting eddy currents into the bore of the core prior to each injection of electrical energy.

9. The method of claim 7 including the step of disposing the predetermined length of electrically conductive wire in an accumulating means, winding the wire in the core slots from the accumulating means, and injecting at least one surge of electrical energy into the predetermined length of electrically conductive wire.

10. A method for effecting a desired development of at least one coil formed of a predetermined conductor length disposed in a magnetic core while the magnetic core is supported in a coil developing station, the method comprising the steps of: winding a portion of the predetermined conductor length directly into coil-accommodating means of the magnetic core to form a number of conductor turns; injecting at least one surge of electrical energy into the conductor turns to develop the turns into part of the at least one coil; and winding at least one more portion of the predetermined conductor length directly into the coil-accommodating means to form additional conductor turns.

11. The method of claim 10 including the step of disposing the predetermined conductor length in an accumulating means and winding the conductor length into the coil accommodating means of the magnetic core from the accumulating means.

12. The method of claim 10 including the step of interrupting each winding step prior to injecting the at least one surge of electrical energy into the conductor turns.

13. A method of developing electrical turns formed from a predetermined length of electrically conductive wire, in coil-accommodating slots of a magnetic core, the method comprising the steps of: placing electrical turns in coil-accommodating slots of a magnetic core as the core is being supported by a core holder at a turn-distributing station; maintaining the core holder and core having the electrical turns in the turn-distributing station, and establishing an electrical connection of at least the electrical turns across an electrical energy surge source; and generating at least one electrical energy surge in the electrical turns as the core having the electrical turns is still supported at the turn-distributing station to create electromagnetic forces in the vicinity of the electrical turns which act thereon to effect desired turn alteration, whereby in-situ development of the electrical turns is achieved.

14. The method of claim 13 in which a structure having electrically conductive material is disposed in a position next to the electrical turns in the coil-accommodating slots of the magnetic core at the turn-distributing station when generating the at least one electrical energy surge in the electrical turns to effect the desired alteration of the turns.

15. The method of claim 13 in which a portion of the predetermined length of electrically conductive wire is carried in an accumulator as a number of the electrical turns are being placed in the coil-accommodating slots of the magnetic core, and establishing the electrical connection of the predetermined length of electrically conductive wire, including the electrical turns, across the electrical energy surge source.

16. A method of developing electrical turns, formed from a predetermined length of electrically conductive wire, in coil-accommodating slots of a magnetic core having a bore, the method comprising the steps of: distributing a number of electrical turns in coil-accommodating slots of a magnetic core by a turn-distributing member entering the bore as the magnetic core is being supported by a core holder at a preselected location; withdrawing the turn-distributing member from the bore while maintaining the core holder and core having the number of electrical turns in the preselected location; and generating at least one electrical energy surge in the number of electrical turns, produced by an electrical energy surge source, as the core having the number of electrical turns is still supported by the core holder at the preseletced location to create electromagnetic forces in the vicinity of the number of electrical turns which act thereon to effect the desired turn alteration, whereby in-situ development of the number of electrical turns is achieved.

17. The method of claim 16 in which a structure having electrically conductive material is disposed in the bore of the magnetic core in the preselected location after withdrawing the turn-distributing member from the bore while maintaining the core holder and core having a number of electrical turns in the preselected location; and the structure is maintained in the bore at the preselected location when generating at least one electrical energy surge in the number of electrical turns to effect the desired turn alteration.

18. The method of claim 17 wherein after the number of electrical turns have been altered, withdrawing the structure from the bore of the magnetic core having a number of electrical turns supported by the core holder in the preselected location, and distributing an additional number of electrical turns in coil-accommodating slots of the magnetic core as the magnetic core is still being supported by the core holder at the preselected location.

References Cited

UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—596 X |
| 3,348,183 | 10/1967 | Hodges et al. | |
| 3,353,251 | 11/1967 | Linkous | 29—205 |

JOHN F. CAMPBELL, Primary Examiner

J. L. CLINE, Assistant Examiner

U.S. Cl. X.R.

29—596